Feb. 13, 1951 W. A. FONKEN 2,541,046
APPARATUS FOR FEEDING AND ALIGNING FISH
Filed Oct. 31, 1941 5 Sheets-Sheet 2

INVENTOR
William A. Fonken
BY
ATTORNEY

Feb. 13, 1951 W. A. FONKEN 2,541,046
APPARATUS FOR FEEDING AND ALIGNING FISH
Filed Oct. 31, 1941 5 Sheets-Sheet 3

Fig. 3

INVENTOR
William A. Fonken
BY
ATTORNEY

Feb. 13, 1951 W. A. FONKEN 2,541,046
APPARATUS FOR FEEDING AND ALIGNING FISH
Filed Oct. 31, 1941 5 Sheets-Sheet 5

INVENTOR
William A. Fonken
BY
Albright Arnold
ATTORNEY

Patented Feb. 13, 1951

2,541,046

UNITED STATES PATENT OFFICE 2,541,046

APPARATUS FOR FEEDING AND ALIGNING FISH

William A. Fonken, Seattle, Wash., assignor to Smith Cannery Machines Company, Seattle, Wash., a corporation of Washington Application October 31, 1941, Serial No. 417,374

29 Claims. (Cl. 17—3)

My invention relates to the art of providing sidewise traveling aligned movement of fish in succession to a fish header knife.

More particularly, my invention relates to the art of aligning varying sized fish which are being fed over a fish table longitudinally thereof in succession to a header knife so that the head may be severed without wastage of meat, even though the individual heads are long or short, according to the different sizes of the fish. This involves individual alignment of the fish with respect to the header knife so that even though the feeding conveyor is traveling at a relatively high speed, the same predetermined point of each fish is brought positively and uniformly into desired relation with the plane of cutting of the header knife and wastage of meat is avoided.

The scientific name for the bone structure engaged in moving the fish transversely of the table is "cleithrum." Therefore, when reference is made herein to "pectoral girdle" or "gill opening forming or bordering bone structure," it is to be understood it is the bone structure known as "cleithrum" which is intended to be identified. For brevity sake, "cleithrum" is used in the claims.

In common commercial practice in the canning of fish, an operator manually feeds the fish to the knife known as the "header." Often the rate of feed is as many as thirty-five hundred fish per hour. To have the knife engage the fish just back of the pectoral girdle avoids wastage, as the head and parts severed therewith constitute refuse. Accordingly, the operator who feeds the fish to the knife is strictly instructed to cut as close as possible to the pectoral girdle without cutting the same but to be sure to miss all gill parts. Since he must avoid gill parts with the meat, he ordinarily tries to positively leave with the head sufficient of the fish meat to insure omitting all gill parts and as a result there is a considerable and practically unavoidable wastage. The constant complaint in all plants directed against the operator feeding the fish is "You are wasting too much fish with the head." A fundamental object of my invention is to provide for the aligning of the fish with respect to the plane of cutting of the header knife to be a matter of mechanical control.

My invention saves approximately one salmon of the number of salmon heretofore required to produce a case of forty-eight one pound cans. When it is remembered that the average annual pack over a ten year period for the North Pacific canneries amounts to 8,260,000 cases, it is manifest that my invention is directed to conserving a relatively large amount of one of our most important natural food resources. One year the pack numbered 10,800,000 cases.

Also under the present common practice of manually feeding the fish to the header knife, there is considerable danger to the fingers of the operator, particularly when the operator becomes fatigued, as occurs when a heavy run of fish is encountered and the cannery is maintained in continuous operation for extended periods. It is quite impractical for the operator to attempt to keep his eyes directed constantly to a certain limited section, as the knife engaging area of a fish, for a long period of time. To avoid becoming dizzy operators find it necessary to look away temporarily and for this reason, as well as for fatigue, or having the attention directed elsewhere, or otherwise, accidents to operators' fingers do happen. Attempts to overcome this danger have been made with the use of fish conveyor chains, but these have not proven successful. Conveyor chains are not employed in the vast majority of the plants because the operators find that it is not convenient to handle the fish over such devices. Accordingly, it is the exception, rather than the rule, where such chain conveyors are employed.

The capacity or rate of operation of the fish dressing machine in common use greatly exceeds the ability of human hands to feed and also to precisely align the fish relative the plane of cutting of the knife. Since the period of run of fish, such as salmon, is limited, great pressure for speed arises to render the harvest as great as possible. Conesquently, while greater wastage results of this important natural resource at the higher speeds, due to severing edible flesh part with the head portion, yet, even at slower speeds great wasting occurs as this is practically impossible to be avoided where human control is relied upon for precise alignment. This wastage is also otherwise expensive as it occurs after a considerable investment is made by the canneryman in the fish over the basic price paid the fisherman therefor, by way of transportation and handling the fish and maintaining stationary and floating equipment for receiving the same.

My invention provides for aligning the fish in advance of the automatically operated header knife so that thereafter the fish is carried under the knife and the cut for severing the head is made at the desired economical point of the fish without the hand of the operator contacting the fish at the time the knife engages the fish, or even for a relatively considerable distance in advance of the knife and all this with a regularly maintained increase of speed over that commonly employed.

If we abut the nose of the fish against a guide the location of the pectoral girdle back from the guide will vary obviously according to the size of the fish. This distance will have a range of as much as four and one-half inches. Since fish are naturally slimy and the feeding tables and all conveying mechanism become slimy therefrom, and since the form of the fish is tapered, it is most difficult to position the fish definitely and accurately beneath the header knife to have the knife strike the fish just back of the pectoral girdle.

It is a primary object of my invention to provide a machine which will eliminate the danger to the operator's fingers and which will positively and accurately position in succession the different sized fish being fed over a feed table so that the header knife will sever the head by cutting just back of the pectoral girdle, and all this with a regularly maintained increase of speed over that commonly employed.

The above mentioned general objects of my invention, together with others inherent in the same, are attained by the mechanism illustrated in the following drawings and the method herein set forth, the same being preferred exemplary forms of embodiment of my invention, throughout which drawings like reference numerals indicate like parts.

Figs. 1 to 7 inclusive show a feed table 20 having spaced apart parallel longitudinal slots 21 therein. Conveyor lugs 22 protrude upwardly through the slots 21 for the purpose of engaging with fish 23 that are positioned crosswise of the table and moved longitudinally thereof.

The lugs 22 are carried by link belts 24 which run on sprocket wheels 25. The sprocket wheels 25 are carried by shafts 26.

The fish 23, after passing over the table 20 are delivered down an incline 27 into a trough 28 from which they are fed to a fish cleaning machine 29. As the fish cleaning machine is not a part of this invention, it is not herein shown in detail but is indicated by dot and dash lines.

I have herein illustrated three of the link belt conveyors 22, 24, positioned side by side, but it will be understood that a greater or less number of these conveyors may be used.

Figure 1:
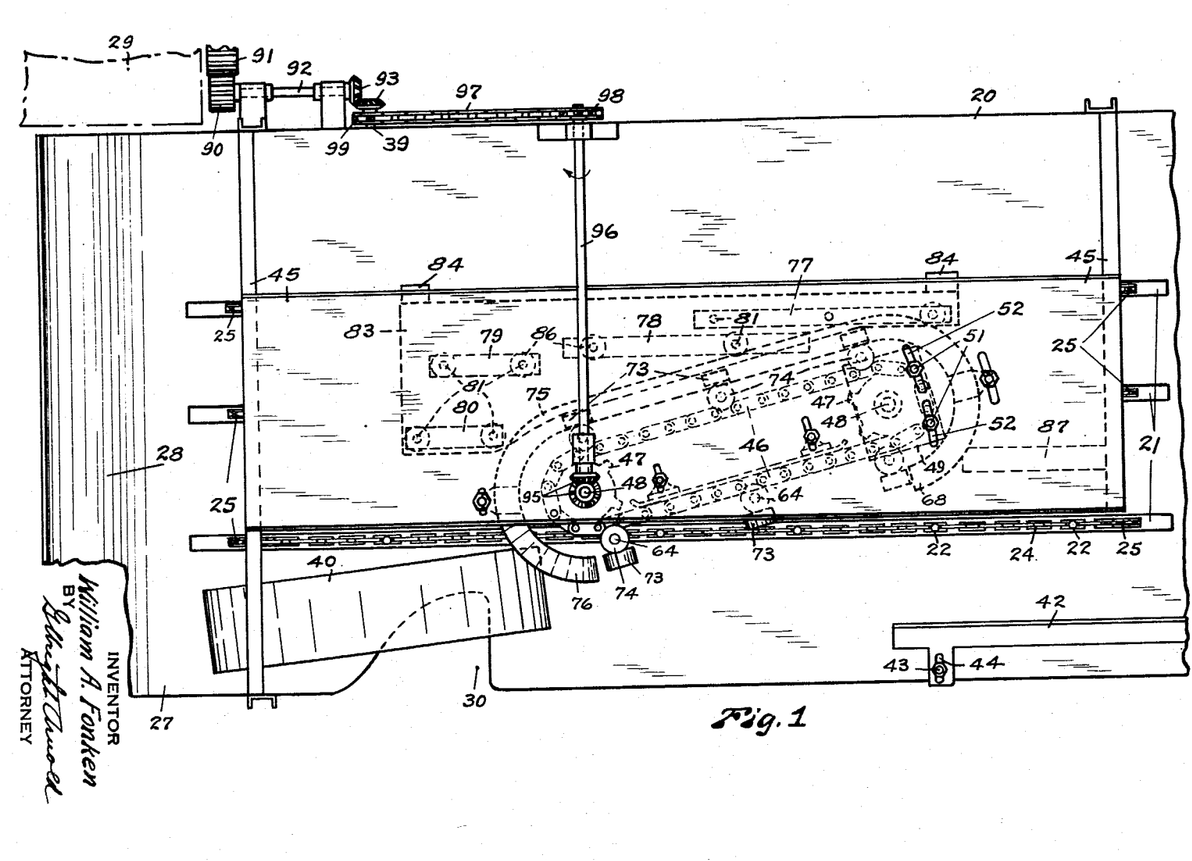
Figure 1 is a plan view, with parts broken away, of apparatus constructed in accordance with my invention, a fragment of a fish dressing machine being shown therein by dot and dash lines.
Figures 2, 17, 18:
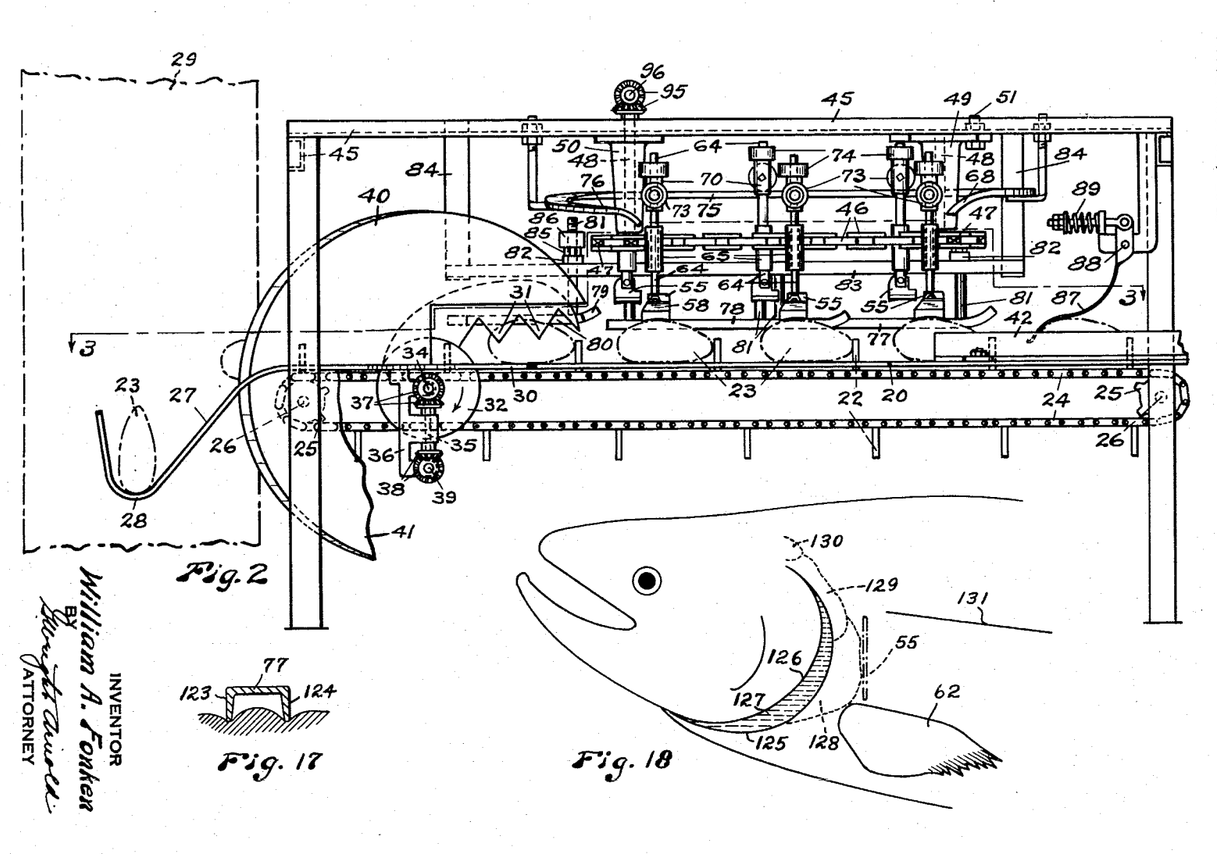
Fig. 2 is a side elevation, with parts broken away, of the device shown in Fig. 1, the positions of a plurality of fish in the device being shown by dot and dash lines.
Fig. 17 is a diagrammatic view in cross section of the channel-shaped hold-down means illustrating the reception of raised portions of the fish between its flanges.
Fig. 18 is a side view of a salmon head showing the cartilaginous or bone-like structure forming the gill opening.
Figure 3:
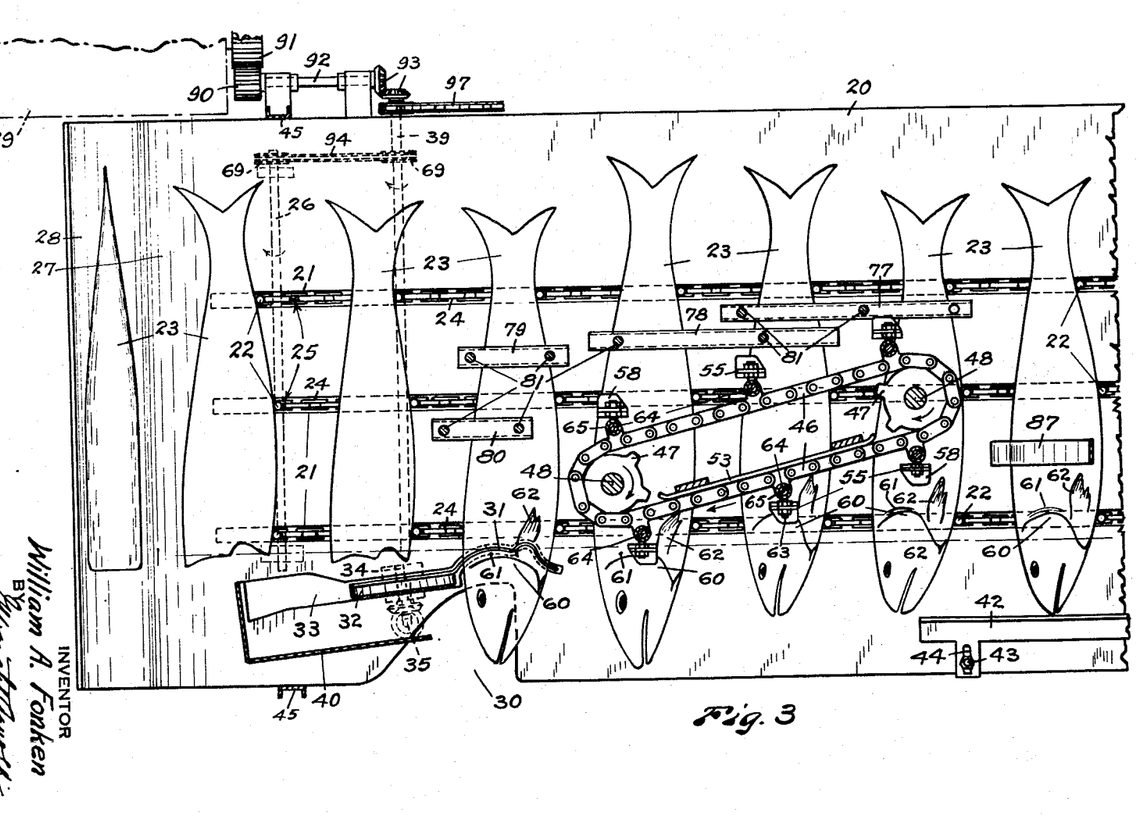
Fig. 3 is a view partly in plane and partly in section taken substantially on broken line 3—3 of Fig. 2 and showing by full lines a plurality of fish in the machine.

The fish 23 may be manually fed to the end of the conveyors shown at the right in Figs. 1, 2 and 3. The side of the table 20 toward which the heads of the fish are directed is provided with a notch or cut away portion 30 at the location where the fish are decapitated to allow the fish heads to drop clear of the table.

A decapitating knife 31, commonly known in the trade as "header knife," is secured to a rotary disc 32 and operates through an opening 33 in the table 20 at a location adjacent the notch 30. The disc 32 is secured to a shaft 34 that is journaled in bearings 36. The shaft 34 is connected by bevel gears 37 with an upright shaft 35. Other bevel gears 38 connect the upright shaft with a horizontal shaft 39 which is driven by means hereinafter described.

A shield 40 is provided over the header knife above the table 20 and a similar shield 41 is preferably provided for this knife below the table. A fragment of the lower shield 41 is shown in Fig. 2 and it will be understood that this shield 41 is shaped so that it will not interfere with the free dropping of the fish heads. The upper shield 40 is suitably notched and cut away so that the heads of the fish will pass thereunder and so that the bodies of the decapitated fish will clear this shield.

It is to be noted that the header knife is positioned at an angle or incline, i. e., it rotates in a plane which is inclined as respects the direction of travel of the fish, so that said knife, in its upward travel, will be clear of the bodies of the fish it has decapitated in its downward travel. It is also to be noted that the knife 31 is not straight as viewed from the edge of said knife, see Fig. 3, but is curved to a shape best adapted to decapitate the fish with a minimum of waste of the edible portion of the fish. This curvature of the knife has a bearing in determining the angle at which the knife is to be mounted.

A guide member 42 is provided on the table 20 adjacent the side thereof against which the noses of the fish are initially placed. Preferably adjustable means, such as a bolt 43 (Fig. 1) operable in a slot 44 of the guide member 42, is used for securing the guide member 42 to the feed table. The fish are placed on the table with the tips of the nose touching this guide member. This initially positions each fish near enough to the correct position so that the automatic fish positioning means hereinafter described can engage with each fish, irrespective of variations in the size of the fish, and accurately position each fish with respect to the plane of cutting of the header knife 31 to thereby insure a minimum waste of edible fish.

The devices for properly aligning the fish relative to the knife and the devices for holding the fish down on the feed table as the fish are being moved or advanced toward the knife are supported above the feed table by overhead supporting means 45.

The fish aligning means shown in Figs. 1 to 7 inclusive comprises a link belt 46 positioned above the feed table 20 and carried on sprocket wheels 47. The sprocket wheels 47 are supported on upright shafts 48 that are preferably journaled in bearing brackets 49 and 50. The bearing brackets 49 and 50 are secured, preferably by bolts 51, to the overhead support 45. Preferably the bolts 51 that hold the bearing bracket 49 nearest to the intake end of the feed table are adjustable in one or more slots 52 in the overhead support 45 so that said bearing bracket 49 may be adjusted transversely of the feed table to thereby adjust the angular position of the link belt 46 relative to the direction of movement of the conveyors 22, 24 as hereinafter explained.

The lap of the link belt 46 (Fig. 6) that is positioned nearest to the heads of the fish is preferably supported and guided by an L-shaped track member that preferably has an upright flange 53 supporting the inner edge of the link belt and a horizontal flange 54 positioned directly under the link belt 46 to support the weight of the same.

The lap of the link belt 46 that is supported by the guide member 53—54 is positioned at an angle to the direction of movement of the conveyor belts 22, 24 and may move in the same general direction as the top lap of the conveyor belts 22, 24. Therefore it is apparent that this lap of the link belt 46 will have a component of movement longitudinally as respects the feed table and a component of movement transversely as respects the feed table. The speed of this longitudinal component of movement and the speed of movement of the fish lengthwise of the table are equal.

The link belt 46 carries a plurality of spaced apart devices for engaging with the fish and moving the same transversely of the table into proper alignment with the knife 31 as said fish are being moved lengthwise of the feed table.

Figures 4, 5, 6, 7, 8, 9, 10, 11, 12:
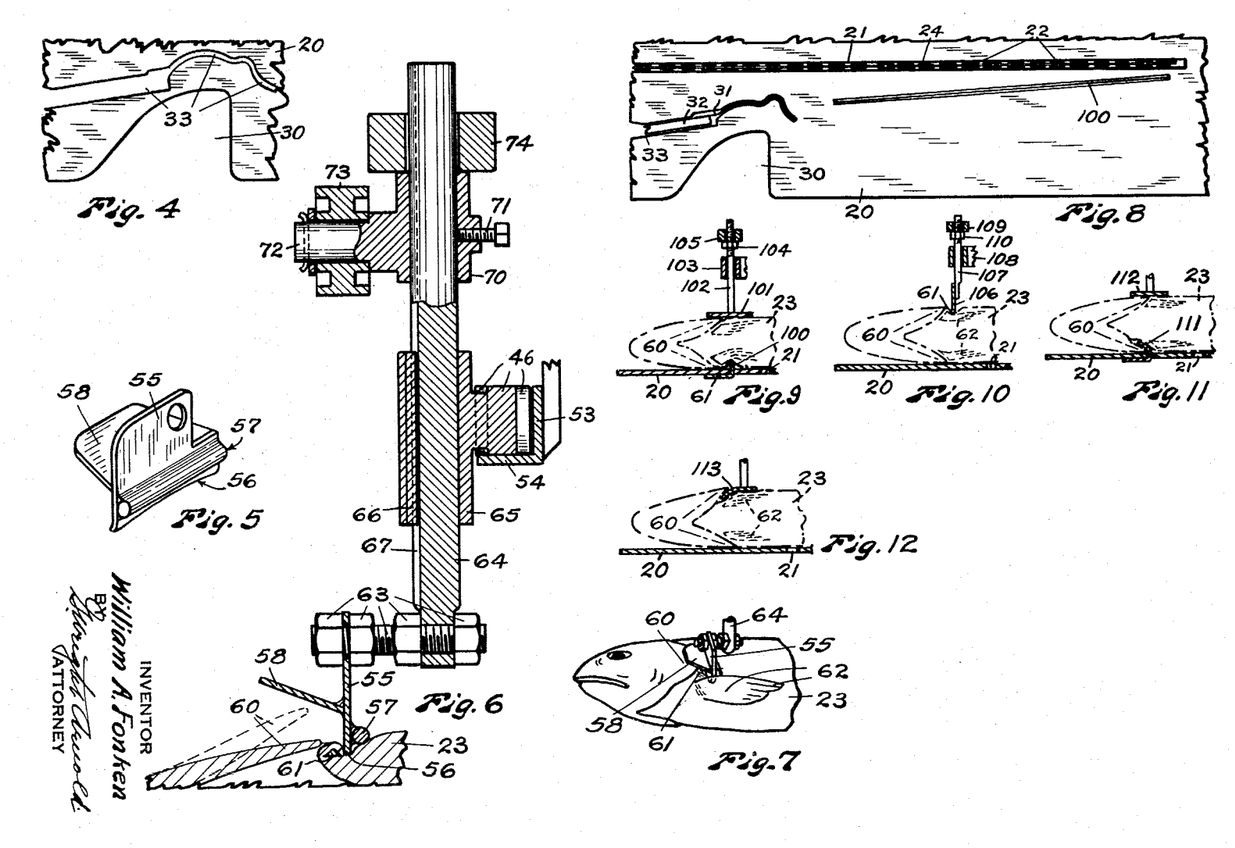
Fig. 4 is a fragmentary plan view of a portion of a feed table including the table slot for the header knife and therefore showing indirectly the form of the header knife.
Fig. 5 is a detached perspective enlarged view of an edged plate fish engaging aligning member for moving a fish transversely on a fish feeding table.
Fig. 6 is a view partly in section and partly in elevation on a larger scale than Figs. 1, 2 and 3, showing an edged plate fish engaging aligning moving member and supporting devices therefor and showing a fragment of a fish operatively engaged by the said fish engaging aligning member.
Fig. 7 is a fragmentary perspective view on a smaller scale than Figs. 5 and 6, showing an edged plate fish engaging aligning member positioned in operative engagement with the pectoral girdle and pectoral fin portions of a fish.
Fig. 8 is a fragmentary plan view of a modified form of feed table having thereon a non-movable angularly positioned fish engaging aligning member.
Fig. 9 is a fragmentary view partly in section and partly in elevation, illustrating the use of the feed table shown in Fig. 8, a fragment of a fish being shown by dot and dash lines in said Fig. 9.
Fig. 10 is a fragmentary view partly in section and partly in elevation, showing a non-movable angular member positioned above the fish for transversely guiding the fish on the table, a fragment of a fish being shown by dot and dash lines.
Fig. 11 is a view similar to Figs. 9 and 10 but showing a gill or opercle engaging non-movable member secured on a feed table for engaging underneath the gill or opercle of a fish and positioning the fish on the feed table.
Fig. 12 is a view similar to Fig. 11, except that Fig. 12 shows a gill or opercle engaging member supported above the fish and engaged underneath the gill or opercle of the same.

The fish engaging aligning plate members, see Figs. 5 and 6, may each comprise an upright plate member 55 having a curved lower edge portion 56 conforming in general to the curved sides of a fish adapted to first contact the fish body and depress the skin while sliding thereover and finally engage the gill opening forming or bordering bone structure of a fish 23 as shown in Figs. 2, 3 and 6. A flange member 57 is rigid with the plate 55 on the rear side thereof a short distance above the curved edge portion 56. This flange 57 constitutes a secondary fish engaging member which will engage with the body of a fish, as shown in Fig. 6, after the edge 56 of the plate 55 has indented itself a predetermined distance into the fish body. This flange 57 thus helps to limit the distance to which the plate 55 will indent itself into the body of the fish and said flange 57 is particularly useful when fish of soft texture are being handled.

A plate like flange 58 is rigidly secured to the front side of the plate 55 and extends forwardly therefrom at an upward incline. This flange 58 extends forwardly over the gill or opercle bone 60 of a fish when the lower edge portion 56 of the plate 55 is engaged back of the pectoral girdle 61 of said fish as shown in Fig. 6. When the plate 55 is pressing against the fish adjacent the pectoral girdle the gill or opercle 60 will ordinarily be caused to rise upwardly into a position such as shown by dash lines in Fig. 6 and in the event that the plate 55 should slide over the pectoral girdle portions 61 of the fish instead of engaging behind the same and moving the fish transversely of the feed table, then the gill or opercle 60, which is of fairly firm texture, will be engaged by the plates 55 and 58 and the fish will be to a degree moved into alignment relative to the knife.

The gill or pectoral fin 62 of the fish may also be of use in the positioning of the fish. The corner portion of the plate 55 will often enter slightly underneath the base of the gill fin 62, as shown in Fig. 7, and press against the relatively firm base portion of this gill fin to help move the fish.

Each plate member 55 is preferably adjustably connected by bolt and nut means 63, see Fig. 6, with the lower end portion of an upright rod 64. Each rod 64 extends upwardly through and is slidably supported by a guide tube 65. Each guide tube 65 preferably has a key 66 rigid therewith that fits within a keyway 67 in the rod 64 and prevents rotary movement of the rod. The guide tubes 65 are fixedly connected with the links of the link belt 46, preferably at uniformly spaced apart intervals.

A sleeve 70 is provided on each upright rod 64 above the guide tube 65 and is adjustably connected with the rod 64 by any suitable means such as a set screw 71. Each sleeve 70 has a bearing stud 72 whereon a roller 73 is journaled. The rods 64 preferably extend above the sleeves 70 and are adapted to receive weights 74. The pressure of the plate members 55 on the fish may be varied by varying the weights used on the rods 64.

The lap of the link belt 46 closest to the heads of the fish, is always traveling in the same direction as the advancing fish when the device is in operation, while the other lap of the link belt 46 is always traveling in a direction opposite to the direction of movement of the fish. The fish engaging aligning plate members 55 preferably are lowered upon and are first brought into contact with the fish after they pass around the forward sprocket wheel 47 at the right in Figs. 1, 2 and 3. Then, they slide over the fish, depressing the skin until they engage the pectoral girdle or other bone structure bordering or forming the gill opening. The further travel of the fish engaging aligning plate members move the fish transversely of the table until the shoulder girdle or other predetermined part is brought into desired alignment with the plane of cutting of the header knife, i. e., until the said members reach the location of the other sprocket wheel 47. They are then disengaged from the fish and are raised clear of the fish and supported above the fish throughout the remainder of each cycle of their travel. Figs. 1 and 2 show a cam track 75 positioned in the path of the rollers 73 for controlling the vertical movement of the same. This cam track 75 may be straight throughout the major portion of its length but is provided with an inclined lifting portion 76 adjacent the sprocket wheel 47 shown at the left in Figs. 1, 2 and 3. Also, if desired, an inclined portion 68 may be provided at the end of the cam track 75 where the fish engaging members are lowered onto the fish.

The conveying mechanism for the fish cleithrum engaging clip 55 in general, and for brevity sake, may be called a "driven carrier," and may be any suitable clip mover mechanism which moves the clip in a substantially rectilinear path or flight while the clip engages the fish.

A plurality of hold down members 77, 78, 79 and 80 are preferably provided for holding the fish down on the table while the fish are being positioned and fed to the knife. The number and location of these hold down members may be varied to meet different requirements. Preferably these hold down members are of channel shaped cross section with the side flanges 123 and 124 of the channel shaped members contacting the fish. In Fig. 17 these flanges 123 and 124 show how they "crease" the fish whereby the channel receives between its flanges raised portions of the fish. When thus used the side flanges of the two channel shaped hold down members 77 and 78 crease the fish that are being moved by conveyors 22, 24 longitudinally of the table 20 under these hold down members and prevent said fish from being moved transversely of the table 20 until the fish engaging aligning plate members in sliding over the fish reach a point of engagement with the pectoral girdle portions 61 of the fish.

The hold down members 77, 78, 79 and 80 are vertically movable and are supported by rod members 81 which are rigid with the hold down members and extend upwardly through tubular guide members 82 (Fig. 2) in a sub-frame 83 that is supported from the overhead frame 45, herein shown of plate character, by brackets 84. Nuts 85 limit the downward movement of the rods 81 and easily replaced removable weights 86, as desired, may be provided on the rods 81 above the nuts 85 to provide the desired pressure of the hold-down members on the fish. Preferably the rods 81 are somewhat loosely supported so that the hold down members 77, 78, 79 and 80 will be free to rock to a limited extent as fish of varying size pass thereunder. This may be accomplished by supporting the rods 81 loosely in the guide members 82 or it may be accomplished in other ways.

A stop member 87 (Fig. 2) fulcrumed on a pivot 88 and urged downwardly by a compression spring 89 is provided adjacent the end of the feed table onto which the fish are fed. Fish that are placed against this stop member manually or by any other feeding means will be brought to a stop in a proper position to be engaged by the lugs 22 of conveyor members 24 by which they will then be advanced under the resilient stop member 87 and over the feed table.

Preferably the driving means for the several pieces of mechanism on this feed table is synchronized with the fish cleaning machine 29. This may be done by positioning a pinion 90 Figs. 1, 3 in mesh with a driven gear 91 of the fish cleaning machine 29. The pinion 90 drives a shaft 92 that is connected by bevel gears 93 with the previously described shaft 39 from which the rotating knife 31 is driven. The shaft 26 (Fig. 3) which carries the sprocket wheels 25 at the discharge end of the conveyors 22, 24 is driven from the shaft 39 by a link belt 94 operating on sprocket wheels 69.

The upright shaft 48 (Fig. 1) which carries the sprocket wheel 47 at the left hand end of the fish positioning link belt 46 as respects the showing in Figs. 1, 2 and 3 is connected by bevel gears 95 with an overhead shaft 96 that is driven from the shaft 39 by a link belt 97 operating on sprocket wheels 98 and 99.

In the operation of the device shown in Figs. 1 to 7 inclusive, the fish are placed crosswise of the feed table in engagement with the stop member 87 with the nose of the fish against the guide member 42. Having the nose against the guide 42, insures that the pectoral girdle of the fish will be in desired spaced relation to the plane of cutting of the header knife 31. This means for the device as shown in Figs. 1–7 that the pectoral girdle of small and large fish always will be engageable by the fish engaging aligning plate members 55. From this position the fish are engaged by the conveyor lugs 22 and advanced or moved toward the knife 31. Movement of the fish positioning link belt 46 is synchronized with movement of the conveyor belts 24 and as the fish are advanced toward the knife a fish positioning member (i. e., fish engaging aligning plate means) 55 drops onto each fish and moves lengthwise of the table with the fish at the same rate of speed as the fish. Also after each fish positioning member has dropped onto a fish, it begins to move along the body of the fish toward the head of the fish, due to the inclined position of the link belt 46 relative to the length of the table. Each fish positioning member will slide lengthwise over the body of the fish it rests on, depressing the skin until it reaches the relatively firm pectoral girdle portion 61 or other gill opening forming or bordering bone structure of the fish, after which it will slide the fish transversely of the table, i. e., longitudinally of the fish until the fish is correctly positioned relative to the plane of cutting of the header knife.

Each fish will be correctly positioned relative to the knife at the time the fish positioning member in engagement therewith begins to pass around the sprocket wheel 47 nearest the knife. At this time the roller 73 that is connected with the fish positioning member will engage with the inclined portion 76 of the cam track 75 and the fish engaging member 55 will be quickly moved upwardly clear of the fish. The properly positioned or aligned fish will continue to move in a straight line, and when it reaches the position of the knife the cut will be made at the location best calculated to conserve the edible portion of the fish. After a fish engaging member has been elevated by the cam track 75 it will be held in the elevated position during its return trip toward the infeed end of the machine and after passing around the sprocket wheel 47 shown at the right in Figs. 1, 2 and 3 it will again drop downwardly onto a fish.

Figs. 8 and 9 show another type of mechanism for positioning the fish relative to a header knife as they are moved over a feed table. In these figures the feed table 20 is provided with a fixed fish positioning member in the form of a metal rib 100 that projects above the surface of the table far enough to engage back of the pectoral girdle portion 61 of a fish 23, see Fig. 9. This metal rib 100 is positioned at an angle relative to the slots 21, which extend lengthwise of the table, and the end of this rib 100 adjacent the knife terminates in substantial alignment with the plane of cutting of the header knife. Preferably a hold down member 101 for the fish 23 is provided substantially above the rib 100. The hold down member shown in Fig. 9 is a flat plate having upwardly protruding rods 102 secured thereto. The rods 102 are slidably supported in guide members 103 and have nuts 104 thereon above the guides 103. Weight means 105 may be used if desired to load the rods 102 and provide any desired pressure on the hold down members 101. Preferably the upper edge of the rib 100 is bent over slightly, as shown in Fig. 9, to provide for better engagement with the pectoral girdle portion 61 of a fish.

In the operation of the fish positioning means shown in Figs. 8 and 9 the fish are fed to the machine by placing them crosswise on the table 20, either on the rib 100 or in advance of the rib 100, so that as they are moved by the conveyor lugs 22 they will pass onto said rib 100. In thus feeding the fish onto the feed table the fish are positioned so that the rib 100 will first engage with or contact the fish back of the pectoral girdle portion of said fish. As each fish is moved over the rib 100 toward the knife it will slide over the rib 100 until such rib is in engagement with the pectoral girdle portion of the fish, after which further movement of the fish toward the knife will cause the fish to be moved to the left as respects the showing in Fig. 9 until said fish is brought into correct alignment with the knife at the instant it passes beyond the end portion of the rib 100.

Fig. 10 shows a fish positioning member 106 disposed above the fish and adapted to engage with the top side of the fish as they move toward the knife. The fish positioning member 106 is supported at an angle corresponding to the angle of the rib 100 of Fig. 8, so that it will press against the gill opening forming bone portion 61 of the fish and move the fish to the left as respects the showing in Fig. 10 as the fish is being moved toward the knife. Preferably the fish positioning member 106 is supported by upright rods 107. Each rod 107 extends upwardly through a guide means 108 and is adapted to be loaded to any desired extend by one or more weights 109 that rest on nuts 110. The fish positioning member 106 operates in the same manner as the rib 100 of Figs. 8 and 9 except that the member 106 operates from above instead of from below the fish.

Fig. 11 shows a fish positioning member 111 of hook shaped cross section secured to a feed table in an angular position as respects the length of the table and adapted to hook under the gill or opercle 60 of a fish 23 to position the fish relative to a knife as the fish is moved toward the knife. The length and incline of the fish positioning member 111 preferably is similar to the length and incline of the rib member 100 of Figs. 8 and 9. In feeding the fish onto a feed table equipped with the fish positioning member 111 the fish preferably are initially positioned with the hooked aligning member 111 in engagement with the gill or opercle. Thereafter as the fish are advanced toward the knife they will be moved transversely of the table and properly aligned relative to the knife. Preferably a hold down member 112 is positioned above the fish positioning member 111.

Fig. 12 shows a fish positioning member 113 supported from above and adapted to engage beneath the gill or opercle 60 on the upper side of a fish 23. The device of Fig. 12 is similar to the device of Fig. 11, except that it engages beneath the upper instead of the lower gill or opercle of the fish.

Figure 13:
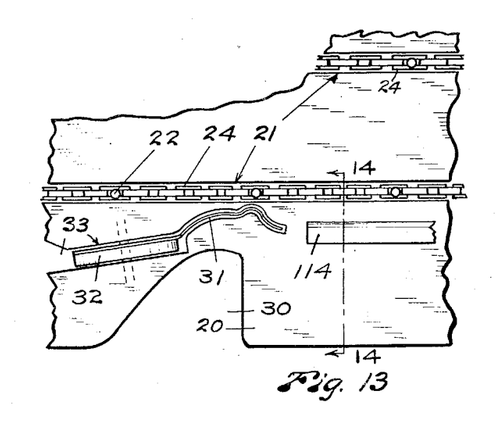
Fig. 13 is a fragmentary plan view of a feed table showing thereon other fish positioning means.
Figure 14:
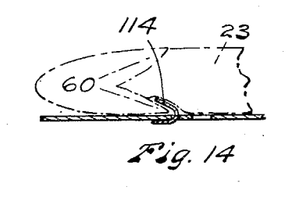
Fig. 14 is a fragmentary sectional view taken substantially on broken line 14—14 of Fig. 13 and showing the table and showing by dot and dash lines a fragment of a fish thereon.

Figs. 13 and 14 show a fragment of a feed table 20 having conveyor means 22, 24 and a rotating knife 31 all similar to the correspondingly numbered parts shown in the preceding figures. The fish positioning means shown in Figs. 13 and 14 comprises a fish positioning member 114 of hook shaped cross section positioned parallel to the length of the table. The hook like portion of the member 114 is directed toward the side of the feed table on which the header knife is located. The member 114 is not positioned at an angle or incline but is parallel to the direction of movement of the fish lengthwise of the feed table. Also the member 114 is properly aligned with the plane of cutting of the rotating knife 31 so that when the gill or opercle 60 of a fish 23 is engaged with said hook, as shown in Fig. 14, the fish will be positioned in proper alignment with the knife irrespective of the size of the fish, within the size limits obtaining in the fish being fed to the fish cleaning machine. The fish are engaged with the positioning member 114 by an operator who positions the fish crosswise of the member 114 with the head and gill portion of the fish at the left of the member 114, as respects the showing in Fig. 14, and then pushes the fish across the member 114 until the lower gill 60 or opercle or shoulder girdle of the fish is caught under the lip of the member 114 and endwise movement of the fish is stopped by the positioning member 114. The conveyor means 22, 24 will then move the fish in a straight line until the fish passes beyond the positioning member 114 and under the knife.

Figure 15:
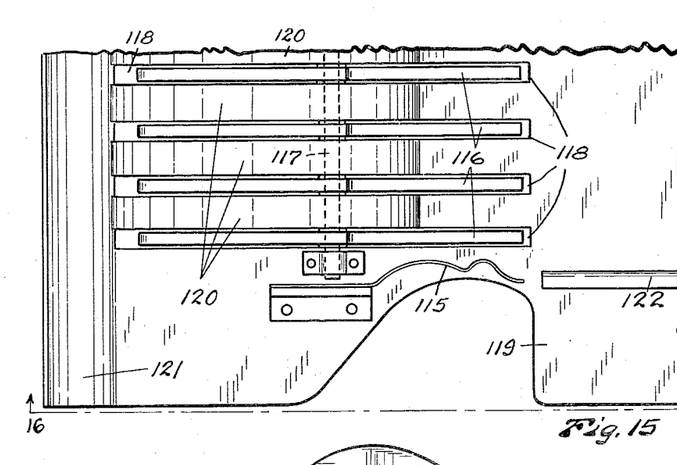
Fig. 15 is a plan view of a feed table that does not have any conveyor but that has fish positioning means in accordance with this invention and is provided with a fixed knife together with means for moving the fish against said fixed knife.
Figure 16:
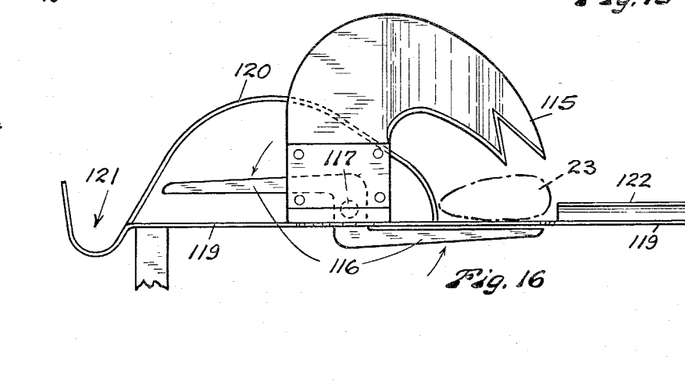
Fig. 16 is a fragmentary side elevation of the device shown in Fig. 15 looking in the direction indicated by line 16—16 of Fig. 15 and indicating by dot and dash lines a fish on the feed table.

Figs. 15 and 16 show a feed table 119 having a fixed knife 115 against which the fish are moved by arms 116 that are secured to a driven shaft 117 and rotate in a counterclockwise direction, as respects the showing in Fig. 16. The arms 116 operate through slots 118 in the table 119. Arched guide members 120 are provided between the arms 116 to guide the fish 23 as they are moved upwardly past the knife and are delivered into a trough 121. A fish positioning member 122 of hook shaped cross section is provided on the feed table 119 in proper alignment with the fixed knife 115. The member 122 is similar in cross sectional shape to the member 114 shown in Figs. 13 and 14 and the gill or opercle or pectoral girdle portions of the fish are similarly placed in engagement with the member 122 by the operator. As there is no fish conveying mechanism on the table 119 the operator, after correctly aligning the fish 23 on the table by means of the member 122, then moves or advances the fish to the left, Figs. 15 and 16, in a straight line until said fish 23 is positioned against the guide members 120 as shown by dot and dash lines in Fig. 16. From this position the arms 116 move the fish past the fixed knife by which the cut is made at the proper location and then deliver the fish into the trough 121.

Fig. 18 shows the head of the fish with the gill opening formed between the heavy line 125 marking the edge of the gill opening on the body side and the line 126 marking the edge of the opercle on the head side of the gill opening. The shaded portion 127 indicates the inner wall of the gill opening on the body side. The bone structure forming the gill opening, it is understood, consists in part of the bone 128, the cleithrum, and bone 129 known as the supracleithrum. The post temporal 130 is shown just above the supracleithrum. These bones are shown in dotted lines for the reason that they lie under the skin and yet the skin is sufficiently transparent so that their outline can readily be seen. The plate 55 is shown in dotted line as it is about to engage the cleithrum. Line 131 represents the lateral line of the fish.

In feeding fish to the "Iron Chink" machine for dressing, the common practice has been for the operator to manually push the fish by the nose portion into position beneath the header knife. This, as explained above, has proven very wasteful of the edible meat, too much meat is severed along with the head due to lack of precision alignment. The invention of applicant involves the discovery that the fish has in the gill opening forming or bordering bone structure, preferably that part of the pectoral girdle known as the cleithrum and supracleithrum, an engageable part which may be reliably utilized in moving the fish transversely of the table into precise desired aligned position relative the plane of cutting of the header knife, and then that said engageable part is of a character permitting disengaging of the transverse moving means without disturbing the alignment. Irrespective of the variations in the size of the individual fish, such bone structure in each and every fish bears a fixed relation to the edible meat portion. While the portion of the fish body above the pectoral girdle, i. e., the dorsal portion, is quite firm, the body immediately rearward of the pectoral girdle is soft and very depressible, so that it provides a readily engageable portion for engagement for transverse moving, even though the skin is exceedingly slippery due to the fish slime coating. Manifestly many structures may be employed to utilize the method of my invention and engage the fish by the gill opening forming or bordering bone structure and thus align the fish with the plane of cutting of the header knife to most completely utilize the edible meat portion of the fish. Several such structures are set forth herein. My discovery also includes the fact that it is possible to move skin depressingly a fish engaging means of my invention, and at the same time to have such means slide over the fish in a direction towards the head, even though this is counter to the direction of the fish scales, and bring the fish into desired alignment.

In referring herein to the "bone structure" it is meant to refer to the bone-like or cartilaginous structure (at least the non-meat portion), whether the same be scientifically true bone or of a cartilaginous nature.

Obviously, changes may be made in the forms, dimensions and arrangement of the parts of my invention, without departing from the principle thereof, the above setting forth only preferred forms of embodiment.

I claim:

1. In a device for aligning fish with a header knife, fish gill opening bordering bone structure engaging plate means positioned to move longitudinally of and to skin depressingly contact a fish in moving to engagement with said bone structure; and a skin depressing limiting flange connected with said plate means.

2. In a device for aligning fish with a header knife, fish gill opening bordering bone structure engaging plate means positioned to move longitudinally of and to skin depressingly contact a fish in moving to engagement with said bone structure; a skin depressing limiting flange connected with said plate means; and a forwardly projecting opercle engaging flange means connected with said plate means.

3. In a device for aligning fish with a header knife, fish gill opening bordering bone structure engaging plate means positioned to move longitudinally of and to skin depressingly contact a fish in moving to engagement with said bone structure, said plate means having a concave fish engaging edge portion; and a skin depressing limiting flange connected with said plate means.

4. In a device for aligning fish with a header knife, fish gill opening bordering bone structure engaging plate means positioned to move longitudinally of and to skin depressingly contact a fish in moving to engagement with said bone structure, said plate means having a fish engaging edge portion with the corners thereof bent forwardly; and a skin depressing limiting flange connected with said plate means.

5. A device for aligning fish with a header knife comprising a table, a fish conveying means operatively carried by said table to advance fish sidewise in a direction longitudinally of said table, a depending fish contacting hold-down means of channel shape cross section of sufficient depth to receive raised portions of a fish therein, and a fish engaging aligning plate means engageable with the gill opening bordering bone structure of a fish, whereby the fish is accurately controllably positioned with respect to the header knife, the aforesaid raising of a portion of the fish being caused by the leg parts of the hold-down means, said engagement by the hold-down means and by the fish engaging aligning means simultaneous.

6. A device for feeding and aligning fish transversely of the plane of cutting of a header knife comprising a fish supporting table operatively positioned with respect to a fish header knife; fish conveying means operatively carried by said table to advance fish sidewise in a direction longitudinal of the table; fish engaging aligning plate means engageable with the gill opening bordering bone structure of a fish, whereby is engaged and aligned an engageable portion directly adjacent the meat portion of fish; a traveling mounting means for said plate means movable in an angular path transverse of said fish table, and a retarding means for positioning a successive fish in a substantially predetermined spaced relation to a preceding fish.

7. A device for feeding and aligning fish transversely of the plane of cutting of a header knife comprising a fish supporting table operatively positioned with respect to a fish header knife; fish conveying means operatively carried by said table to advance fish sidewise in a direction longitudinal of the table; fish engaging aligning plate means engageable with the gill opening bordering bone structure of a fish, whereby is engaged and aligned an engageable portion directly adjacent the meat portion of fish; a traveling mounting means for said plate means movable in an angular path transverse of said fish table; and a resilient and pivotally mounted retarding means for positioning a successive fish in a substantially predetermined spaced relation to a preceding fish.

8. A device for feeding and aligning fish transversely of the plane of cutting of a header knife comprising a fish supporting table operatively positioned with respect to a fish header knife; fish conveying means operatively carried by said table to advance fish sidewise in a direction longitudinal of the table; fish engaging aligning plate means engageable with the gill opening bordering bone structure of a fish, whereby is engaged and aligned an engageable portion directly adjacent the meat portion of fish; a traveling mounting means for said plate means movable in an angular path transverse of said fish table, and a fish nose engaging guide member positioned on the forward end of said table and longitudinally of the path of travel of said conveying means and operatively positioned to guide the gill opening bordering bone structure into operative position for engagement by said fish engaging aligning plate means.

9. In a device for aligning fish with a header knife, a table having a first member for engaging one side portion of a fish; a fish conveying means operatively carried by said table to advance fish sidewise in a direction longitudinally of said table; a second member for engaging the opposite side portion of a fish, at least one of said first and second members extending in a direction longitudinally of said table, resisting movement of a fish laterally of said table, and having two fish engaging inwardly creasing means spaced in a direction laterally of said table and of sufficient depth to provide and receive therebetween an outwardly projecting portion of a fish; and means providing relative movement and pressure of said first and second members toward each other.

10. In a device for aligning fish with a header knife, the combination of a table, a fish conveying means operatively carried by said table to advance fish sidewise in a direction longitudinally of said table, a header knife, and a resiliently mounted depending fish contacting hold-down means operatively positioned as respects said header knife and having two fish engaging creasing means spaced in a direction laterally of said table and of sufficient depth to provide and receive therebetween a projecting portion of a fish, whereby a fish may be held in a predetermined position by said hold-down means while the head of the fish is being cut off by said knife.

11. For use with a fish table for feeding fish to, and aligning fish with a beheading knife, a table having fish feed and discharge end portions; a conveyor mounted adjacent the top of said table having fish engaging means whereby fish lying on their side may be advanced lengthwise of said table; a fish cleithrum engaging clip; a driven carrier having a substantially rectilinear flight angularly disposed with respect to the line of movement of the conveyor, having said clip mounted thereon.

12. For use with a fish table for feeding fish to, and aligning fish with a beheading knife, a table having fish feed and discharge end portions; a conveyor mounted adjacent the top of said table having fish engaging means whereby fish lying on their side may be advanced lengthwise of said table; a fish cleithrum engaging clip; a driven endless carrier having two substantially parallel and rectilinear flights angularly disposed with respect to the line of movement of the conveyor having said clip mounted thereon.

13. For use with a fish table for feeding fish to, and aligning fish with a beheading knife, a table having fish feed and discharge end portions; a conveyor mounted adjacent the top of said table having fish engaging means whereby fish lying on their side may be advanced lengthwise of said table; a fish cleithrum engaging clip; a driven carrier having two spaced apart aligned sprockets, the line joining the centers of which being angularly disposed with respect to the line of movement of the conveyor, and having said clip mounted thereon.

14. The combination as set forth in claim 11, and actuating means for said carrier imparting a constant speed to said driven carrier of a sufficiently increased increment over the speed of the conveyor to render the speed of the clip constantly relatively equal to that of said conveyor.

15. For use with a fish table for feeding fish to, and aligning fish with a beheading knife, a table having fish feed and discharge end portions; a conveyor mounted adjacent the top of said table having fish engaging means whereby fish lying on their side may be advanced lengthwise of said table; a driven carrier having a substantially rectilinear flight angularly disposed with respect to the line of movement of the conveyor; a guide tube fixedly secured to said carrier; a rod fixed against rotation slidingly mounted in said tube; and a fish cleithrum engaging clip mounted on one end of said rod.

16. The combination set forth in claim 15 and: a roller mounted on the opposite end portion of said rod; and a trackway on which said roller bears extending from said beheader station rearward in a plane spaced above said fish greater than the distance from the roller to the bottom of said clip whereby the clip is carried above the advancing fish.

17. A fish table for feeding fish to, and aligning fish with, a beheading knife comprising a table having fish feed and discharge end portions; a beheader knife mounted adjacent the discharge end of said table; a longitudinally-of-the-table fish conveyor mounted adjacent the top of said table having uniformly spaced fish engaging members whereby fish lying on their side may be advanced lengthwise of said table and past said knife; two spaced sprockets mounted above said table, a line joining the centers of such sprockets being angularly disposed with respect to the longitudinal axis of the table and directed towards said beheader knife, an endless chain mounted on said sprockets having a substantially rectilinear flight movable towards said knife between said sprockets; spaced guide tubes mounted on said chain; rods fixed against rotation mounted in said tubes; and a fish cleithrum engaging clip mounted on one end of each of said rods.

18. A fish table for feeding fish to, and aligning fish with, a beheading knife comprising a table having fish feed and discharge end portions; a beheader knife mounted adjacent the discharge end of said table; a longitudinally-of-the-table fish conveyor mounted adjacent the top of said table having uniformly spaced fish engaging members whereby fish lying on their side may be advanced lengthwise of said table and past said knife; two spaced sprockets mounted above said table, a line joining the centers of such sprockets being angularly disposed with respect to the longitudinal axis of the table and directed towards said beheader knife, an endless chain mounted on said sprockets having a substantially rectilinear flight movable towards said knife between said sprockets; spaced guide tubes mounted on said chain; rods fixed against rotation having rollers on one end portion mounted in said tubes; a fish engaging clip mounted on the other end of each of said rods; a substantially horizontally disposed track spaced above said table on which said rollers bear when said clip is moving away from said knife, said track having downwardly curved end portions, whereby said track supports said rollers with their rods and clips above advancing fish.

19. The combination as set forth in claim 11, and a fish hold down member mounted above and adjacent to the top of the table and slidably engageable with fish on the table moved thereunder.

20. The combination as set forth in claim 12, and a fish hold down member mounted above and adjacent to the top of the table and slidably engageable with fish on the table moved thereunder.

21. The combination as set forth in claim 13, and a fish hold down member mounted above and adjacent to the top of the table and slidably engageable with fish on the table moved thereunder.

22. For use with a fish table for feeding fish to, and aligning fish with a beheading knife, a table having fish feed and discharge end portions; a conveyor mounted adjacent the top of said table having fish engaging means whereby fish lying on their side may be advanced lengthwise of said table; a fish cleithrum engaging clip; a driven carrier having a substantially rectilinear flight angularly disposed with respect to the line of movement of the conveyor, having said clip mounted thereon, actuating means for said carrier imparting a constant speed to said driven carrier of a sufficiently increased increment over the speed of the conveyor to render the speed of the clip constantly relatively equal to that of said conveyor, and a fish hold down member mounted above and adjacent to the top of the table and slidably engageable with fish on the table moved thereunder.

23. The combination as set forth in claim 15, and a fish hold down member mounted above and adjacent to the top of the table and slidably engageable with fish on the table moved thereunder 24. For use with a fish table for feeding fish to, and aligning fish with a beheading knife, a table having fish feed and discharge end portions; a conveyor mounted adjacent the top of said table having fish engaging means whereby fish lying on their side may be advanced lengthwise of said table; a driven carrier having a substantially rectilinear flight angularly disposed with respect to the line of movement of the conveyor; a guide tube fixedly secured to said carrier; a rod fixed against rotation slidingly mounted in said tube; a fish cleithrum engaging clip mounted on one end of said rod, a roller mounted on the opposite end portion of said rod; a trackway on which said roller bears extending from said beheader station rearward in a plane spaced above said fish greater than the distance from the roller to the bottom of said clip whereby the clip is carried above the advancing fish, and a slidingly holding and releasing fish hold down member mounted above and adjacent to the top of the table and slidably engageable with fish on the table moved thereunder.

25. The combination as set forth in claim 17, and a fish hold down member mounted above and adjacent to the top of the table and slidably engageable with fish on the table moved thereunder.

26. The combination as set forth in claim 18, and a fish hold down member mounted above and adjacent to the top of the table and slidably engageable with fish on the table moved thereunder.

27. The combination as set forth in claim 11, and a fish hold down member floatingly mounted above and adjacent to the top of the table and slidably engageable with fish on the table moved thereunder.

28. The combination as set forth in claim 13, and a fish hold down member floatingly mounted above and adjacent to the top of the table and slidably engageable with fish on the table moved thereunder.

29. For use with a fish table for feeding fish to and aligning fish with a beheading knife, a table having fish feed and discharge end portions; a conveyor mounted adjacent to the top of said table having fish engaging means whereby fish lying on their side may be advanced lengthwise of said table; a fish cleithrum engaging clip; clip drive means having a substantially rectilinear flight angularly disposed with respect to the line of movement of the conveyor; and means operatively interconnecting said clip and said clip drive means to effect movement of said clip conjointly with said drive means.

WILLIAM A. FONKEN.

REFERENCES CITED

The following references are of record in the file of this patent:

UNITED STATES PATENTS

| Number | Name | Date |
| --- | --- | --- |
| 1,473,961 | McPhee | Nov. 13, 1923 |
| 1,643,504 | Lea | Sept. 27, 1927 |
| 2,208,644 | Rue | July 23, 1940 |

FOREIGN PATENTS

| Number | Country | Date |
| --- | --- | --- |
| 515,764 | Great Britain | Dec. 13, 1939 |